United States Patent
Mouhot et al.

(10) Patent No.: US 7,850,457 B2
(45) Date of Patent: Dec. 14, 2010

(54) ANTISTATIC DEMONSTRATOR

(75) Inventors: Frederic Mouhot, Charenton le Pont (FR); Berangere Penaud, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 382 days.

(21) Appl. No.: 12/094,834

(22) PCT Filed: Apr. 21, 2006

(86) PCT No.: PCT/FR2006/050372

§ 371 (c)(1),
(2), (4) Date: May 23, 2008

(87) PCT Pub. No.: WO2007/060346

PCT Pub. Date: May 31, 2007

(65) Prior Publication Data

US 2008/0272763 A1    Nov. 6, 2008

(30) Foreign Application Priority Data

Nov. 23, 2005  (FR) ................... 05 53577

(51) Int. Cl.
*G09B 25/00* (2006.01)
(52) U.S. Cl. .................... 434/370; 434/301
(58) Field of Classification Search ............ 434/276, 434/300, 301, 302, 365, 367, 370
See application file for complete search history.

(56) References Cited

U.S. PATENT DOCUMENTS

| 3,028,685 | A | * | 4/1962 | Silverman | 434/301 |
|---|---|---|---|---|---|
| 3,081,558 | A | * | 3/1963 | Giezendanner | 434/301 |
| 3,628,854 | A | * | 12/1971 | Jampolsky | 351/175 |
| 3,973,335 | A | * | 8/1976 | Price | 434/126 |
| 4,886,459 | A | * | 12/1989 | Fuller | 434/300 |
| 5,242,307 | A | * | 9/1993 | Reinbold | 434/298 |
| 5,788,506 | A | * | 8/1998 | Chabay | 434/301 |
| 6,152,741 | A | * | 11/2000 | Hirata | 434/301 |
| 6,254,396 | B1 | * | 7/2001 | Stevens | 434/276 |
| 6,419,498 | B1 | * | 7/2002 | Ikeda et al. | 434/409 |

(Continued)

FOREIGN PATENT DOCUMENTS

JP    2002-031739    *    1/2002

OTHER PUBLICATIONS

International Search Report, issued in International Application No. PCT/FR2006/050372, dated Sep. 22, 2006.*

*Primary Examiner*—Kurt Fernstrom
(74) *Attorney, Agent, or Firm*—Fulbright & Jaworski L.L.P.

(57) ABSTRACT

The present invention relates to a device for demonstrating the antistatic properties of at least one first transparent glass substrate, at least part of one of the main surfaces of which is an antistatic surface, said device comprising a hollow box having an upper surface provided with at least one window to which said first transparent glass substrate is fitted, wherein said box contains elements capable of moving under the action of electrostatic attraction, said elements being chosen from cellular particles of synthetic or natural polymers, individualized fibers of synthetic or natural polymers and their blends.

The present invention further relates to a method for demonstrating the antistatic properties of at least one first transparent glass substrate by means of the above device.

31 Claims, 2 Drawing Sheets

U.S. PATENT DOCUMENTS

| | | | |
|---|---|---|---|
| 6,585,523 B2 * | 7/2003 | Tokunaga et al. | 434/409 |
| 6,852,406 B2 * | 2/2005 | Marechal et al. | 351/159 |
| 6,988,799 B2 * | 1/2006 | Heisman | 351/46 |
| 7,353,693 B2 * | 4/2008 | Ueyama | 73/53.01 |
| 2005/0174533 A1 * | 8/2005 | Renard | 351/158 |

* cited by examiner

ANTISTATIC DEMONSTRATOR

This application is a national phase application under 35 U.S.C. §371 International Application No. PCT/FR2006/050372 filed 21 Apr. 2006, which claims priority to French Patent Application No. 05/53577 filed 23 Nov. 2005. The entire text of each of the above-referenced disclosures is specifically incorporated herein by reference without disclaimer.

The present invention generally relates to a device for demonstrating the antistatic properties of a transparent glass substrate, and to a method for demonstrating the antistatic properties of a transparent glass substrate by means of said device. The device of the present invention does more particularly aim at visually demonstrating the antistatic properties of a transparent glass substrate, optionally by comparing the same with a transparent glass substrate devoid of antistatic properties.

The present invention, the aim of which is to demonstrate in a clear and univocal manner the efficiency of an antistatic treatment, by showing for example that an antistatic glass does not attract nor retain dust, of course reveals useful and finds applications by spectacle manufacturers and opticians and especially in demonstration tests intended to be used by opticians and their customers.

According to the invention, transparent substrates do encompass optical lenses, ophthalmic lenses and more particularly ophthalmic lenses for spectacles.

The way to produce and to treat transparent substrates, especially ophthalmic lenses is well known and will not be further described here.

Generally speaking, an ophthalmic glass, whether it is a mineral or an organic glass, does undergo one or more treatment(s) that is or are intended for example to make it more impact-resistant and/or more abrasion-resistant or to provide it with anti-reflective properties. All these treatments, their application methods and the effects they do impart are well known from the person skilled in the art and hence will not be further described here.

It is well known to charge an object with static electricity by rubbing its surface using an object such as a cloth for instance, or a piece of synthetic foam or polyester. The thus loaded static energy does attract and retain onto the surface of the rubbed object small particles that are present all around. This static charge indeed is responsible for dust and small particles to remain adhered to transparent substrates.

A transparent substrate is generally considered as having acceptable antistatic properties when it does neither attract nor retain dust as well as small particles.

It is also known that depositing onto the surface of transparent substrates an electric conducting coating, such as for example in an anti-reflective stack, enables to quickly drain off the static charge and thus to prevent the treated glass from attracting and retaining particles. A substrate having such a quality is a so called "antistatic substrate" and as such does possess a main surface that is said to be antistatic.

This property is often associated with the static potential of the material. When the static potential of the material is of about 0 KV+/−0.1 KV, said material is antistatic; by contrast, when after having rubbed the material surface as previously indicated, its static potential differs from 0 KV+/−0.1 KV, the material is said to be static and it does possess a main surface said to be antistatic. It can then attract to it small objects present in the vicinity thereof.

The international application WO 01/55752 describes transparent antistatic substrates, especially ophthalmic lenses, as well as embodiments thereof.

There are tests for demonstrating the antistatic property for opticians and their customers. These tests all rely upon the ability for the antistatic glasses to drain off a static charge resulting from rubbing with a cloth. For instance, this ability may be quantified by measuring the dissipation time of a corona-applied charge. Thus, antistatic glasses do have a discharge time of about one hundred milliseconds, whereas it accounts for about several tens of seconds for static glass.

Most of the known demonstrating tests do suffer from being limited and do not allow to measure discharge times of less than approx 500 ms.

But some transparent substrates without any conducting coating already have the interesting antistatic properties with discharge times of about two hundred milliseconds, so that it is not possible with the hereabove mentioned tests to make a distinction with other glasses.

In fact they may be distinguished from each other, but in a relatively undemonstrative way, i.e. by limiting the time interval between rubbing and attracting the particles, that is to say by charging the glasses in the particle close vicinity. This may be done by rubbing a Teflon® rod and by bringing it immediately into contact with the glasses. As an alternative, simply wiping the two glasses with a paper tissue may also be suggested, then observing the retained particles under an indirect light and on a black background.

Recently, a demonstration tool has been developed that is enclosed with "Teflon Easycare®" ophthalmic lenses. This tool based on the hereabove described concept is made of an ophthalmic glass, the one half of which is treated with an anti-reflective and antistatic stack and the other one is treated with an anti-reflective stack. The glass is secured in a plastic mould impression. 1×3 mm paper squares are arranged in the bottom of the mould impression. According to the use instructions provided with this tool, by rubbing the glass with an activator composed of a rod, one end of which is covered with a plastic foam, the paper pieces are attracted under the glass and get fixed to the glass on static side thereof. The experiment showed that this tool is not demonstrative enough and not always convincing.

There is therefore a real need for a demonstration tool that would be easy to use, efficient and above all highly demonstrative.

After a number of tests, the applicant solved the previously mentioned problems by developing a ready-to-use and easy-to-handle tool. The demonstration with this tool is easy to perform and makes it possible to obtain outstanding, convincing demonstrative visual results.

The device that was developed by the applicant is a hollow box comprising at least one transparent glass substrate which is partly or fully antistatic, and suitably selected, low-weight elements that are able to be attracted by a static charge.

The appended drawings illustrate the present invention:

FIG. 1 shows a device of the invention in its most basic form, while

Figure 1:
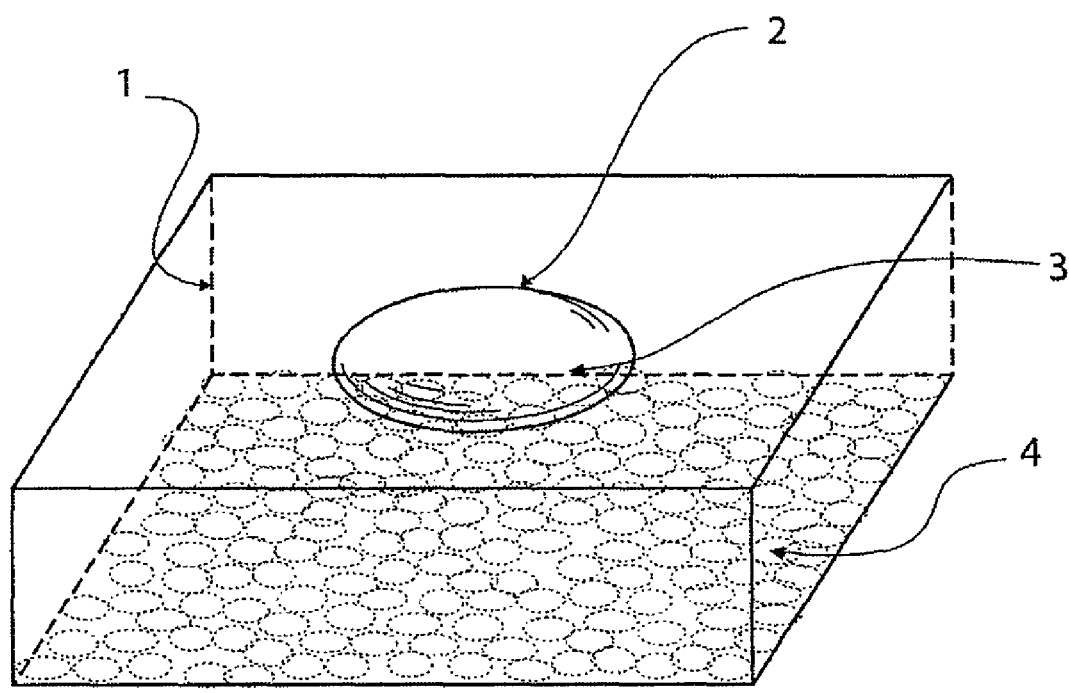
Figure 1:
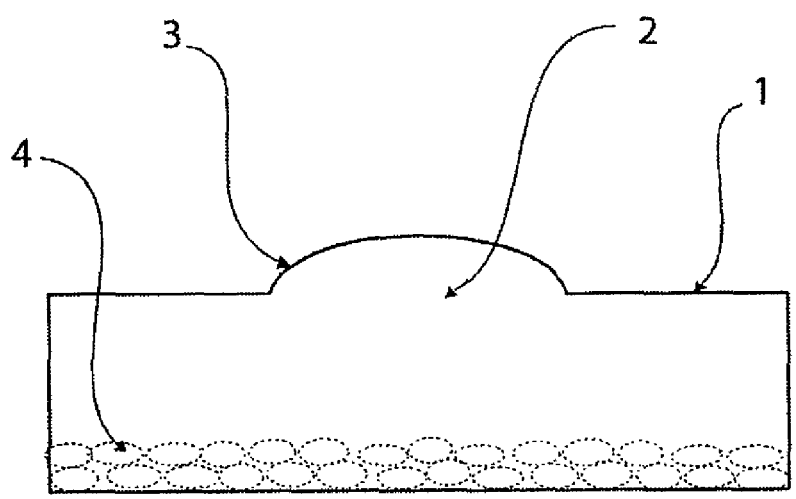

Referring to the drawings, it is a first object of the present invention to provide a device for demonstrating the antistatic properties of at least one first transparent glass substrate (3), at least part of one of the main surfaces of which is an antistatic surface, said device comprising a hollow box having an upper surface (1) provided with at least one window (2) to which said first transparent glass substrate (3) is fitted, said box (1) containing elements (4) capable of moving under the action of electrostatic attraction, said elements being preferably chosen from cellular particles of synthetic or natural polymers, individualized fibres of synthetic or natural polymers and their blends.

The main surface of the first transparent glass substrate (3) which is at least partly antistatic may be that one which is facing the inside of the box (1) or that which is facing the outside of the box (1). It will be preferably the one facing the outside of the box (1).

As referred to hereafter, an "antistatic substrate" is intended to mean a substrate, one of the main surfaces of which, for all or part only, is an antistatic surface. Said substrate may be made antistatic for example by depositing a conductive coating in the anti-reflective stack or by any other suitable means.

As used herein, a "static substrate" is intended to mean a substrate one of the main surfaces of which, for all or part only, is a static surface. It may be a raw substrate or a substrate having undergone various treatments.

According to a first embodiment of the invention, the upper surface of the box (1) comprises only one window (2) to which a transparent glass substrate (3) is fitted. This first embodiment of the invention is illustrated schematically on FIG. 1.

According to a second embodiment of the invention, the device further comprises a second window (2a) to which a second transparent glass substrate (3a) is fitted, at least part of one of the main surfaces of the first transparent glass substrate (3) and/or of the second transparent glass substrate (3a) being a static surface. In this case, the upper surface of the box (1) is provided with two windows (2) and (2a) to which two transparent glass substrates (3) and (3a) are respectively fitted, at least one of which being at least partly antistatic (i.e., at least one part of one of its main surfaces is antistatic) and at least one of which being at least partly static (i.e., at least one part of one of its main surfaces is static). The distance between the ends of the two windows (2) and (2a) may vary from 0 to a few centimeters, typically from 0 to 5 cm.

Figure 2:
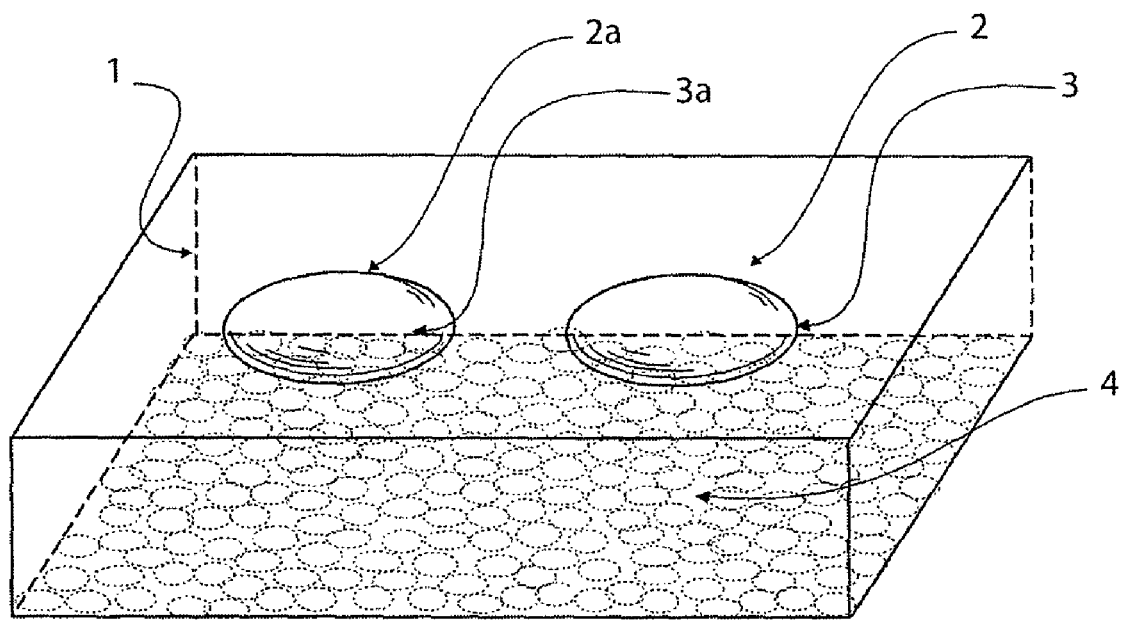
FIG. 2 shows a more sophisticated alternative of such device.
Figure 2:
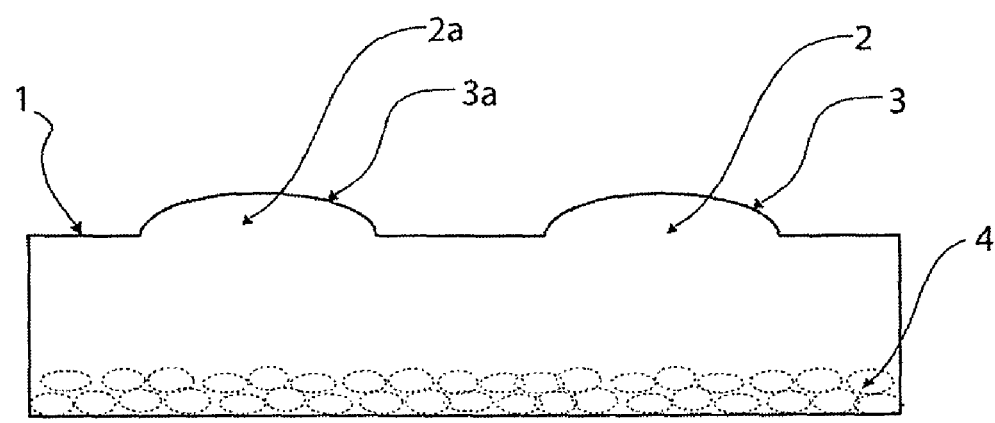

This second embodiment of the invention is illustrated schematically on FIG. 2. It does enable to visually easily compare the electrostatic attraction induced by both substrates.

The first transparent glass substrate (3) may present in various forms. In a first alternative, one of the main surfaces of the first transparent glass substrate (3) is an antistatic surface in its entirety. In this case, if the device of the present invention comprises a second window (2a) to which a second transparent glass substrate (3a) is fitted, it is preferred that one of the main surfaces of the second transparent glass substrate (3a) be a static surface in its entirety. This embodiment is the most preferred embodiment of the invention.

In a second alternative, only half of one of the main surfaces of the first transparent glass substrate (3) is an antistatic surface, the other one being a static surface. For instance the case of a transparent glass substrate (3) may be envisaged, which for a half only was submitted to an antistatic treatment. In this case, if the device of the present invention comprises a second window (2a) to which a second transparent glass substrate (3a) is fitted, the second transparent glass substrate (3a) may be a fully or partly static or antistatic substrate.

The transparent glass substrates that are used in the present invention may also comprise a plurality of substrate pieces that are connected to each other, amongst which all did not undergo an antistatic treatment.

Thus, for fitting to a window (2) a first transparent glass substrate (3), one of the main surfaces of which, for a half, is an antistatic surface and for the other half is a static surface, a fully antistatic substrate could be used, taking up the one half of the window (2), and a fully static substrate taking up the second half of the window (2).

The elements (4) should be light enough to be capable of moving under the action of electrostatic attraction.

Numerous elements (4) may be used according to the invention, which electric permittivity, size or density, as well as the distance between them and the transparent glass substrates, should be adapted so that the electrostatic attraction being exerted onto the same by a charged body in the close vicinity thereof be higher than gravity.

Elements (4) will be preferably used, which have a relative electric permittivity lower than 6 pF/m, more preferably ranging from 0.5 to 5 pF/m, and even more preferably ranging from 1 to 4 pF/m. Such permittivity values are obtained at a temperature of 23° C. and with a moisture content of 50%.

Yet preferably, elements (4) will be used which density is lower than 150 g/L, more preferably lower than 100 g/L, and even more preferably ranging from 10 to 20 g/L. Densities are measured at ambient temperature.

The permittivity or dielectric constant of an insulant is expressed as related to that of the air (equivalent to that of vacuum). It is noted epsilon and is expressed in picofarad/meter.

Vacuum permittivity equals 8.85 pF/m. The permittivity of a material is the product obtained by multiplying its relative permittivity by that of vacuum. Relative permittivity values given by the constant tables are approximate and may noticeably vary depending on frequency, temperature, hygrometry or even on atmospheric pressure. The permittivity values mentioned in the present application are all expressed under temperature and pressure ambient conditions (25° C., 1 bar), unless otherwise specified.

Amongst the elements (4) fulfilling the permittivity and density criteria as previously defined, fly dust may be mentioned, as well as talc powder, small-sized squares of aluminium foils, small-sized paper pieces or fibres, cellular particles of synthetic or natural polymers or individualized fibres of synthetic or natural polymers. The previously mentioned polymer cellular particles or polymer individualized fibres may be optionally charged with carbon black.

As used herein, "cellular particles" are intended to mean particles which structure contains cells.

According to the most preferred embodiment of the invention, the elements (4) are cellular particles of synthetic or natural polymers, individualized fibres of synthetic or natural polymers or their blends. These elements (4) may contain carbon black.

Cellular particles of polymers are preferably chosen from foams and beads of expanded polymers, preferably from foams and beads of expanded polymers of polyethylene, polyvinyl chloride, polystyrene, acrylonitrile-butadiene-styrene (ABS), polyurethane and their blends.

In one embodiment of the invention, cellular particles are spherical or pseudo-spherical beads with a diameter of less than 8 mm, preferably ranging from 0.5 to 5 mm, more preferably from 0.5 to 3 mm. When the particles are pseudo-spherical, the diameter corresponds to that of the smallest sphere that may include said particles.

Preferred elements (4) according to the invention are expanded polystyrene beads, having preferably a diameter of less than 5 mm, more preferably ranging from 0.5 to 3 mm, and preferably a density lower than 100 g/L, more preferably lower than 50 g/L and even more preferably ranging from 10 to 20 g/L. The expanded polystyrene may be crystal polystyrene or high-impact polystyrene (HIPS).

The expanded polystyrene beads are white in nature. However they may be coloured so as to make the test more demonstrative. Colouring may be effected using any suitable means with one or more dyes. Expanded polystyrene beads for example may be used, which were mass-coloured or even just superficially coloured with various dyes, that may be fluorescent or not.

As the permittivity depends amongst others on the moisture prevailing in the medium, it is important to prevent any moisture variation inside the box. It is recommended for example to use a thoroughly closed box, that is damp- and water vapour-proof. For example the transparent glass substrates may be crimped with a ring or be fastened in the corresponding windows using a cement or a glue. In this case, the glass surface which contacts the cement should be slightly abraded to improve the adhesion. Any type of cement or glue may be a priori contemplated. The only constraint to be taken into account is the cement compatibility with the material that is used for making the hollow box of the invention.

The hollow box of the invention may be made of any adapted material. It is preferably made of a transparent or translucent material.

Conductive or non conductive materials may be used. Boxes made of conductive materials may be used for instance to be able to partly discharge the elements (4) and/or to prevent them to adhere to the inner surface of the box. It may also be envisaged to coat the inner surface of the box with an antistatic agent such as for example those used for computer screens.

Preferably, the hollow box is made of a material chosen from thermoplastic polymers, preferably from polystyrene, optionally plasticized polyvinyl chloride, methyl polymethacrylate, acrylonitrile-butadiene-styrene (ABS), and polycarbonates. The polystyrene may be crystal polystyrene or high-impact polystyrene (HIPS). Amongst those materials, the most preferred include polystyrene, especially high-impact polystyrene, and ABS, preferably of the transparent or translucent type.

The transparent glass substrates (3) and (3a) are preferably optical lenses, more preferably ophthalmic lenses and even more preferably ophthalmic lenses for spectacles. The glass substrate may be a mineral or an organic glass, having been optionally previously submitted to one or more specific treatment(s).

The device of the invention is intended to be used together with a static effect-activating object. Preferably, the device of the invention comprises a static effect-activating object of the activator-adapter type provided on its end with a piece of foam, for instance a piece of plastic foam, or a polyester or microfibre cloth. These two examples of course should not be taken as a limitation of the present invention.

The present invention further relates to a method for demonstrating the antistatic properties of at least one first transparent glass substrate (3) by means of the previously described demonstrating device, comprising the following steps of:

a) charging the first transparent glass substrate (3) with static electricity by rubbing the main surface thereof facing the outside of the box (1) with a static effect-activating object; and b) observing the possible moving of the elements (4) that might move under the action of electrostatic attraction.

When the device of the present invention comprises a second window (2a) to which a second transparent glass substrate (3a) is fitted, given that at least part of one of the main surfaces of the first transparent glass substrate (3) and/or of the second transparent glass substrate (3a) is a static surface, the method for demonstrating the antistatic properties of at least one first transparent glass substrate (3) by means of the demonstrator of the invention comprises the following steps of:

a) charging the first transparent glass substrate (3) and the second transparent glass substrate (3a) with static electricity by rubbing the main surface thereof facing the outside of the box (1) with a static effect-activating object; and b) observing the possible moving of the elements (4) that might move under the action of electrostatic attraction.

The first transparent glass substrate (3) and the second transparent glass substrate (3a) may be charged with static electricity in any order desired, or simultaneously.

The invention claimed is:

1. A device for demonstrating antistatic properties of at least one first transparent glass substrate comprising at least part of a main surface that is an antistatic surface, the device comprising a hollow box comprising an upper surface comprising at least one window in which the first transparent glass substrate is fitted, the box comprising elements capable of moving under action of electrostatic attraction, the elements comprising cellular particles of synthetic or natural polymers, individualized fibres of synthetic, natural, or blended polymers, and/or combinations thereof.

2. The device of claim 1, wherein approximately half of one of the main surfaces of the first transparent glass substrate is an antistatic surface, and the other half of the main surface of the first transparent glass substrate is a static surface.

3. The device of claim 1, wherein one of the main surfaces of the first transparent glass substrate is an antistatic surface in its entirety.

4. The device of claim 1, wherein the elements have a relative electric permittivity lower than 6 pF/m.

5. The device of claim 4, wherein the elements have a relative electric permittivity ranging from 0.5 to 5 pF/m.

6. The device of claim 5, wherein the elements have a relative electric permittivity ranging from 1 to 4 pF/m.

7. The device of claim 1, wherein the elements have a density lower than 150 g/L.

8. The device of claim 7, wherein the elements have a density lower than 100 g/L.

9. The device of claim 8, wherein the elements have a density lower than 50 g/L.

10. The device of claim 9, wherein the elements have a density ranging from 10 to 20 g/L.

11. The device of claim 1, wherein the elements that are capable of moving under the action of electrostatic attraction contain carbon black.

12. The device of claim 1, wherein cellular particles of polymers are chosen from foams and beads of expanded polymers.

13. The device of claim 1, wherein the foams and beads of expanded polymers are chosen from polyethylene, polyvinyl chloride, polystyrene, acrylonitrile-butadiene-styrene, polyurethane and their blends.

14. The device of claim 1, wherein the cellular particles are spherical or pseudo-spherical beads with a diameter of less than 8 mm.

15. The device of claim 14, wherein the cellular particles are spherical or pseudo-spherical beads with a diameter ranging from 0.5 to 5 mm.

16. The device of claim 15, wherein the cellular particles are spherical or pseudo-spherical beads with a diameter ranging from 0.5 to 3 mm.

17. The device of claim 1, wherein the elements are expanded polystyrene beads.

18. The device of claim 17, wherein the expanded polystyrene beads are coloured.

19. The device of claim 1, wherein the hollow box is made of a transparent or translucent material.

20. The device of claim 19, wherein the material comprises a thermoplastic polymer.

21. The device of claim 20, wherein the thermoplastic polymer is polystyrene, polyvinyl chloride, methyl polymethacrylate, acrylonitrile-butadiene-styrene, polycarbonate or a combination thereof.

22. The device of claim 19, wherein the material is chosen from high-impact polystyrene and acrylonitrile-butadiene-styrene.

23. The device of claim 1, wherein the transparent glass substrate is an optical lens.

24. The device of claim 23, wherein the optical lens is an ophthalmic lens.

25. The device of claim 24, wherein the ophthalmic lens is for spectacles.

26. The device of claim 1, further comprising a static effect-activating object.

27. The device of claim 26, wherein the static effect-activating object is an activator-adapter comprising on its end a piece of foam or a polyester or microfibre cloth.

28. The device of claim 1, further comprising a second window to which a second transparent glass substrate is fitted, at least part of one of the main surfaces of the first transparent glass substrate and/or of the second transparent glass substrate being a static surface.

29. The device of claim 28, wherein the ends of the windows are spaced apart by 0 to 5 cm.

30. A method for demonstrating the antistatic properties of at least one first transparent glass substrate by means of the device of claim 1, comprising:
  charging the first transparent glass substrate with static electricity by rubbing the main surface thereof facing the outside of the box with a static effect-activating object; and
  observing any movement the elements that might move under the action of electrostatic attraction.

31. A method for demonstrating the antistatic properties of at least one first transparent glass substrate by means of the device of claim 28, comprising:
  charging the first transparent glass substrate and the second transparent glass substrate with static electricity by rubbing the main surface thereof facing the outside of the box with a static effect-activating object; and
  observing the possible moving of the elements that might move under the action of electrostatic attraction.

* * * * *